Feb. 17, 1959 J. C. SAMUELS 2,874,290

CATHODE-FOLLOWER OSCILLATOR

Filed Sept. 27, 1955

INVENTOR.
JOHN C. SAMUELS.

BY

Lockwood, Galt, Woodard & Smith
ATTORNEYS.

United States Patent Office 2,874,290

Patented Feb. 17, 1959

2,874,290

CATHODE-FOLLOWER OSCILLATOR

John Clifton Samuels, West Lafayette, Ind., assignor to International Telephone and Telegraph Corporation Application September 27, 1955, Serial No. 536,863

4 Claims. (Cl. 250—36)

This invention relates to oscillators and is particularly directed to oscillators of the cathode-follower type.

In the Proceedings of the Institute of Radio Engineers, vol. 33, pages 843–855 of December, 1945, Kurt Schlesinger treated cathode-follower circuits generally, and disclosed an oscillator in which the required phase shift for sustained oscillations was accomplished in a network in the cathode circuit of an amplifier tube. The Schlesinger network looks like a Colpitts tank circuit wtih the cathode and the grid and anode tapped to the middle and ends of the tank. Such an oscillator lacks a resistance connection to the grid, and lacks amplitude and wave shape control of the generated wave. That is, since there is no resistance element common to the cathode and anode circuits, there is no self-regulation of the space current of the amplifier tube. Such a circuit is vulnerable to power supply voltage changes and is not subject to easy changes of frequency.

The object of this invention is an improved cathode-follower oscillator which is relatively stable in frequency in response to changes in power supply voltages; has good wave form; and is easily varied in frequency.

The objects of this invention are attained by two types of cathode-follower oscillators: (1) A cathode-follower oscillator in which the necessary regeneration is accomplished by a bridge network; (2) a cathode-follower "phase-shift" oscillator in which the necessary regeneration is accomplished by a resistance-capacitance ladder network of gain greater than unity. The bridge network oscillator comprises a four-sided bridge network connected between the grid and cathode of a cathode follower amplifier tube. An inductive element is connected across one diagonal of the bridge and capacitive elements are connected to two opposite sides of the bridge and resistive elements are connected in the remaining two opposite sides of the bridge. The grid and cathode of the amplifier are, respectively, connected across the other diagonal of the bridge.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
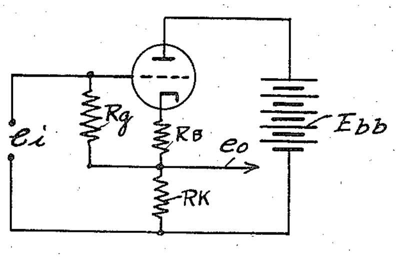
Fig. 1 is a circuit diagram of a conventional known cathode-follower amplifier.

The conventional cathode-follower amplifier may be resolved into the circuit of Fig. 1 in which the cathode resistances $R_B$ and $R_K$ are connected in series with the plate voltage source $E_{bb}$. $R_B$ is common with the grid circuit. The cathode leak resistance $R_g$ is connected between the grid and the upper end of the cathode resistor $R_K$. The gain, A, or $$\frac{e_{out}}{e_{in}}$$

of the amplifier for linear operation at low frequency is:

$$\frac{\mu}{\mu+1}\left(\frac{R_K}{R_K+\frac{r_p}{\mu+1}}\right)$$

where $\mu$ is the amplification factor of the tube
$R_K$ is the cathode resistor
$r_p$ is the tube plate resistance
$e_{in}$ is the input signal, and
$e_{out}$ is the output signal.

It will be noted that the gain of such a cathode-follower-amplifier is inevitably less than unity. In typical operation of the commercially obtainable tubes such as the triode "5718," where the amplification factor is 27 and the plate resistance is 5.0 K ohms and the cathode resistor is 10 K ohms, the gain of the tube as a cathode-follower-amplifier is 0.95.

Figure 2:
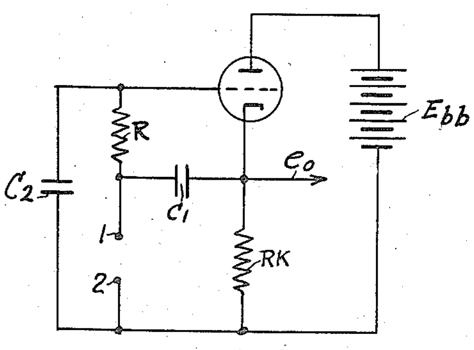
Fig. 2 is a redrawn circuit diagram of the amplifier of Fig. 1.

The circuit of Fig. 1 may be modified as shown in Fig. 2 where $R_B$ and $R_g$ may be omitted since these two components do not enter into the considerations to follow. It can be assumed that the gain of the cathode-follower is essentially unchanged by the described modification even though there is a certain loss in gain due to the loading effect of condensers $C_1$, $C_2$, and resistance R. The impedance, Z, looking into the input terminals 1 and 2 is:

$$Z_{12}=\frac{R}{1+iWC_1R-\frac{1+iAWC_1R}{1+iWC_2R}}$$

when no grid current flows and operation is at medium frequency.

It can be seen that values of $C_1$, $C_2$, R and $R_K$ can be so chosen that the resistive portion of Z is negative. It follows that an appropriate element connected between terminals 1 and 2 will result in the functioning of the modified circuit as an oscillator. Since the reactive portion of Z is capacitive, the appropriate element in this case would be an inductor connected between terminals 1 and 2. The final configuration of the oscillator, comprising this invention, then takes the form shown in Fig. 3.

Figure 3:
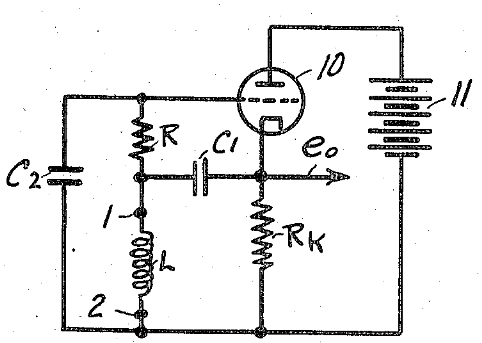
Fig. 3 is a circuit diagram of the cathode-follower oscillator of this invention.

In Fig. 3, cathode resistor $R_K$ is common to the anode circuit and the grid circuit of the grid control amplifier 10. The voltage of the anode source 11 is the rated voltage for the particular amplifier 10 chosen. The resistance R and the inductance L comprise the galvanic grid circuit of the oscillator. Condenser $C_1$ is connected between the cathode of the amplifier tube and the junction of resistor R and inductance L. Condenser $C_2$ is connected in series with resistance R across inductance L. In the circuit of Fig. 3, no grid return resistor or grid bias resistor, aside from the resistances of the phase-shifting network, is required. Bias and amplitude control are provided by resistor R and capacity $C_2$. Resistor R can be so adjusted that nearly Class-A operation takes place, and the output across $R_K$ is a good sine wave.

Figure 4:
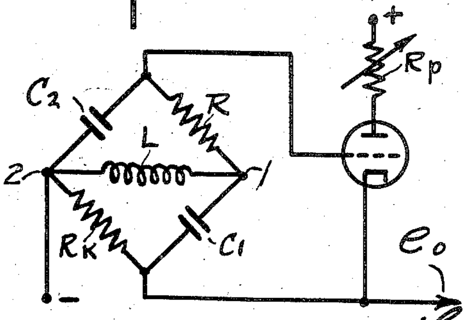
Fig. 4 is a circuit diagram, the same as the circuit diagram of Fig. 3 but redrawn to more clearly show the bridge network of the oscillator of this invention.

By redrawing Fig. 3, as in Fig. 4 the phase-shift character of the network becomes more evident. The network can properly be drawn as a four-sided bridge with inductance L across one diagonal of the bridge and with the grid and cathode connected across the other diagonal of the bridge. The values of $C_1$, $R_K$, and $C_2$, R, may be so chosen that the proper phase and amplitude relation for Barkhausen conditions exist for sustained oscillations. Under these conditions, the output wave of the oscillator, appearing across the resistor $R_K$ which forms one arm of the bridge network, is applied to the inductance-capacitance, L-section consisting of L and $C_1$. The values of L and C are such that, at the frequency of the output signal they are near resonance on the high side of the resonance curve. As a consequence, the portion of the output voltage appearing across L is amplified (enough to overcome losses of the next section) and shifted in phase (leading). This signal is then applied to the resistance-capacitance network comprising the other two arms of the bridge network. In passing through this network the phase lead resulting from passing through the LC section is cancelled by the phase lag of this section. The signal across $C_2$ is thus in phase with the output signal $e_0$. The voltage loss resulting from the signal passing through the $RC_2$ section is such that the signal arriving at the grid is equal to that which existed at the grid at the start of the cycle around the bridge network. Thus, the amplifier is capable of maintaining self-oscillations.

The slight non-linearities in the grid causes rectification; thus enabling resistor R and capacitor $C_2$ to develop grid bias and thereby stabilize the oscillator. Resistor R and inductor L serve as a grid leak eliminating the build-up of static charge on the grid.

The output frequency is stable with respect to supply voltage variations. The reason for this can be understood from a consideration of the following equation for determining the frequency of self-oscillation $$H(s)-\frac{V_p+(\mu+1)Z_0}{\mu Z_0}=0$$

Where H(s) is the transfer function of the bridge network, $s$=parameter of the Laplace transformation,
$V_p$=plate resistance of the tube
$\mu$=amplification factor of tube $$Z_0=\frac{R_k Z_i}{R_k+Z_i}$$

$R_k$=cathode load resistor and
$Z_i$=input impedance to the bridge network.

Clearly $Z_0$ does not depend on the tube characteristics or the supply voltage. It is $V_p$ and to a lesser extent $\mu$ which are sensitive to supply voltage variations. But when the bridge circuit parameters and $R_k$ are properly proportioned $$(\mu+1)Z_0>>V_p$$

and generally $$\frac{\mu+1}{\mu}\approx 1$$

if $\mu$ is large. Hence the frequency equation becomes approximately $$H(s)-1=0$$

which does not involve any tube parameters. Thus the frequency will be determined almost solely by the bridge network. This result is in general conformity with the fact that a cathode-follower amplifier (grounded anode) is relatively free of tube characteristic variation because of the degenerative current feedback from the cathode circuit.

Typical values of the parameters of the cathode follower oscillator of Figs. 3 and 4 for operation in the audio and low radio frequency range are $R$=82,000 ohms; $L$=200 millihenries; the coil resistance, $R_L$=600 ohms; $R_K$=10,600 ohms; $C_1$=0.01 microfarad; and $C_2$=250 micromicrofarads. The triode was of the "5718" type and the gain of the amplifier thus connected is .80.

With these constants, it is found that the frequency of oscillation is fairly sensitive to all parameters except the coil resistance, and that the best control over frequency could be obtained by varying $C_1$. The frequency range was found to be from low audio to middle radio frequencies. Frequency stability during temperature and humidity variations is primarily determined by the dependence of the resistor, capacitor, and inductive elements upon these factors.

If a resistor $R_p$ is inserted in the plate lead of the cathode-follower oscillator of this invention, a variable frequency balanced voltage source may be developed by adjustment of $R_p$ until the voltage across $R_p$ equals the output voltage $e_0$. The insertion of $R_p$ in the plate circuit will not materially affect the operation of the oscillator if the plate supply voltage is adjusted to give the same plate voltage as existed before the insertion of $R_p$. Referring to the expression for gain A tabulated above, it is found that the frequency of oscillation is affected by $R_p$ only when $R_p$ is relatively of large value. Because of the factor $$\frac{1}{\mu+1}$$

the affect of $R_p$ on frequency is considerably reduced.

Figure 5:
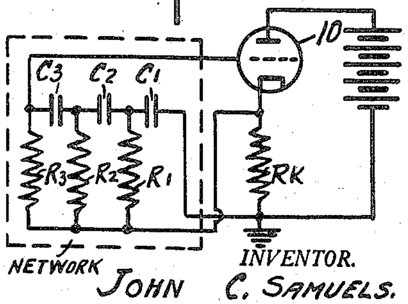
Fig. 5 is a circuit diagram of another form of the invention.

The other cathode follower oscillator attaining the objectives of this invention is shown in Fig. 5 wherein a phase-shift network, of the RC type, is coupled between the cathode resistor and the grid of the amplifier. The network is of the ladder type with series condensers $C_1$, $C_2$, et cetera, and shunt resistors $R_1$, $R_2$, $R_3$, etc. The input terminals of the phase-shift network are connected directly across the cathode resistors $R_K$ and one output terminal of the network is connected directly to the control grid of amplifier 10. In this oscillator, oscillations are maintained by regenerative feedback from the cathode to the grid. This is achieved by phase shifting the signal from the cathode through three (or any appropriate number) RC filters, but taking the output to the grid across the capacitors instead of across the last resistor of the RC ladder. By doing this a voltage gain is obtained from the RC network to overcome the loss through the cathode-follower amplifier. Nevertheless, the signal undergoes no phase shift in traversing the ladder. Thus it arrives in phase with the signal on the grid producing the regenerative effect. This circuit is unusual in that it uses no inductors, no plate feedback and a single tube; yet it is capable of self-oscillation. The essential fact is the over-unity gain RC network for phase-shifting. This network coupling between the cathode resistor and the control grid results in an oscillator of greater stability than can be expected from the standard phase-shift oscillator where the phase-shift network is between the anode and the control grid.

The cathode-follower oscillators of this invention are of the feedback type and are capable of adjustment over a frequency band from low audio frequency range to the low or middle radio frequency range without extensive complications. The frequency of oscillation can be estimated from the linear theory of oscillation, is very stable with respect to supply voltage variations, and is reasonably stable with cathode loading.

While I have described above the principles of my invention in connection with specific apparatus, it is to be clearly understood that this description is made only by way of example and not as a limitation to the scope of my invention.

What is claimed is:

1. A cathode-follower oscillator comprising a four-sided bridge network with an inductive element connected across one diagonal of the bridge, capacitive elements in opposite two sides of the bridge, and resistive elements in the remaining opposite two sides, a grid-controlled amplifier with the grid and cathode of the amplifier connected across the other diagonal of said bridge.

2. A cathode-follower oscillator comprising an amplifier tube with a cathode, a control grid and an anode, an inductance device, a first series-connected capacitance and a resistance connected, respectively, between opposite ends of said inductance and said cathode, a second series-connected capacitance and a resistance connected, respectively, between said opposite ends of the inductance, the juncture of said second series-connected capacitance and resistance being connected to said grid, the relative values of the reactive and resistive elements being such that the grid receives oscillatory potentials in phase with the oscillatory potential of said cathode.

3. A cathode-follower oscillator comprising an amplifier tube with a cathode, a grid, and an anode; a four-sided bridge network, an inductance connected across one diagonal of the bridge, phase-shifting series reactive elements constituting two adjacent sides of the bridge and connected across the inductance, second phase-shifting series reactive elements constituting the other two adjacent sides of the bridge and connected across the inductance, and intermediate points of the first and second mentioned series reactive elements being connected, respectively, to said grid and cathode.

4. A cathode-follower oscillator comprising an amplifier having a grid and cathode, a resistor connected at one end to said cathode, a capacitance connected between the other end of said resistor and said grid, a series-connected resistor and inductor connected across said capacitor, and a second capacitor connected between said cathode, and the juncture of said series-connected resistor and inductor.

References Cited in the file of this patent

UNITED STATES PATENTS

| | | |
|---|---|---|
| 1,941,384 | Bowes | Dec. 26, 1933 |
| 2,769,088 | Holbrook et al. | Oct. 30, 1956 |

OTHER REFERENCES

"An R-C Circuit Giving Over-Unity Gain," by Longmire, in Tele-Tech, pages 40, 41, 112, April 1947.

Proc. I. R. E., vol. 39, No. 7, July 1951, pp. 833–835, "Synthesis of Passive RC Networks With Gains Greater Than Unity," Epstein.

"R-C Networks With Over-Unity Gain," by Bacon, in Wireless Engineer, pages 20–23, January 1953.